United States Patent
Kean (10) Patent No.: US 12,487,086 B2
(45) Date of Patent: Dec. 2, 2025

(54) DETERMINATION OF AN EXCAVATOR SWING BOOM ANGLE BASED ON AN ANGULAR VELOCITY RATIO

(71) Applicant: LEICA GEOSYSTEMS TECHNOLOGY A/S, Odense (DK)

(72) Inventor: Michael Goulet Kean, Odense (DK)

(73) Assignee: LEICA GEOSYSTEMS TECHNOLOGY A/S, Odense Sø (DK)

( * ) Notice: Subject to any disclaimer, the term of this patent is extended or adjusted under 35 U.S.C. 154(b) by 287 days.

(21) Appl. No.: 18/212,393

(22) Filed: Jun. 21, 2023

(65) Prior Publication Data
US 2023/0417548 A1 Dec. 28, 2023

(30) Foreign Application Priority Data
Jun. 22, 2022 (EP) ..................................... 22180532

(51) Int. Cl.
| G01C 19/00 | (2013.01) |
|---|---|
| E02F 9/26 | (2006.01) |
| G01C 25/00 | (2006.01) |

(52) U.S. Cl.
CPC ............. *G01C 19/00* (2013.01); *E02F 9/264* (2013.01); *G01C 25/005* (2013.01)

(58) Field of Classification Search
CPC ...... G01C 19/00; G01C 25/005; G01C 21/16; G01C 1/00; E02F 9/264; E02F 3/325; E02F 3/435; E02F 3/42; E02F 3/38; E02F 9/00; E02F 9/20; E02F 9/22; E02F 9/2203; E02F 9/2264; G01B 21/22; G06F 18/20; G06F 18/253
See application file for complete search history.

(56) References Cited

U.S. PATENT DOCUMENTS

| 5,442,868 | A | * | 8/1995 | Ahn | ....................... E02F 3/435 |
|---|---|---|---|---|---|
| | | | | | 701/50 |
| 2014/0107895 | A1 | | 4/2014 | Faivre et al. | |
| 2021/0215483 | A1 | * | 7/2021 | Krone | ..................... G01S 19/14 |
| 2022/0267999 | A1 | * | 8/2022 | Hartvig Andersen | .. E02F 3/435 |
| 2023/0417025 | A1 | * | 12/2023 | Kean | ....................... E02F 3/435 |
| 2023/0417026 | A1 | * | 12/2023 | Kean | ....................... E02F 3/435 |

FOREIGN PATENT DOCUMENTS

DK          180402 B1     4/2021

OTHER PUBLICATIONS

Extended European Search Report dated Dec. 22, 2022 as received in Application No. 22180532.8.

* cited by examiner

*Primary Examiner* — Xin Y Zhong
(74) *Attorney, Agent, or Firm* — Maschoff Brennan (57) ABSTRACT

A system for determining a swing boom angle of an excavator including a vehicle frame including a cabin, a swing boom arranged on the vehicle frame and configured to be rotated relative to the vehicle frame about a first rotation axis and a pneumatic or hydraulic cylinder. A first end of the pneumatic or hydraulic cylinder is coupled to the vehicle frame and a second end is coupled to the swing boom, wherein the cylinder is configured to be rotated relative to the vehicle frame about a second rotation axis at the first end, wherein the cylinder is configured to rotate the swing boom. The system comprises a first inertial measurement unit (IMU), configured to be mounted on the swing boom and to generate first IMU data, a second IMU configured to be mounted on the cylinder and to generate second IMU data and a processing unit.

15 Claims, 4 Drawing Sheets

DETERMINATION OF AN EXCAVATOR SWING BOOM ANGLE BASED ON AN ANGULAR VELOCITY RATIO

FIELD OF THE DISCLOSURE

The present disclosure relates to a system for determining a swing boom angle of an excavator, wherein the excavator comprises a vehicle frame comprising a cabin, a swing boom arranged on the vehicle frame and configured to be rotated relative to the vehicle frame about a first rotation axis and a pneumatic or hydraulic cylinder. A first end of the pneumatic or hydraulic cylinder is coupled to the vehicle frame and a second end is coupled to the swing boom, wherein the cylinder is configured to be rotated relative to the vehicle frame about a second rotation axis at the first end, wherein the cylinder is configured to rotate the swing boom.

BACKGROUND

Large scale excavators are earth moving machines that includes a lower part that rests on the ground and supports tracks or wheels to move the excavator, a rotating upper part mounted to the lower part by means of a large bearing with a vertical axis of rotation and a dig structure that is composed of several components attached to each other and the rotating upper part by means of linkage pins with horizontal axes of rotation that are parallel to each other.

Miniature excavators are also capable of swinging the dig structure relative to the rotating upper part. There is a pin with a vertical rotation axis in between the dig structure and the rotating upper part. This type of construction is called a swing boom because the boom swings relative to the upper part resulting in a swing boom angle.

Backhoes are earth moving machines that consist of a vehicle frame supported by wheels attached to a loader dig structure and an excavating dig structure. Both digging structures are composed of several components forming a serial kinematic chain ending in a digging implement. Systems exist to track the motion of these kinematic linkages. However, the excavating dig structure is attached to the vehicle frame with a joint that allows the entire dig structure to rotate about the vertical direction with respect to the vehicle frame.

Typical sensing algorithms rely on integrating gyroscopes to measure displacements in position and measuring gravity with an accelerometer to stabilize the gyroscope integrations and detect the true orientation over long time frames. Over time the integration of the gyroscope measurement will drift due to uncorrected bias and sensor noise. The gravity measurement cannot be used to stabilize the swing boom rotation as the rotational axis is aligned or nearly aligned with gravity and thus the swing boom angle has no impact on how gravity is observed by the accelerometers.

DK180402B1 discloses a wire sensor to measure the length of the cylinder used to actuate a swing boom movement on mini excavators with swing boom functionality. The wire sensor is a self-retracting spool of wire that has an angular encoder mounted to measure rotation of the spool relative to the housing. In this installation, the housing is mounted onto the main upper part of the excavator. The wire is extended and affixed to the swing boom structure. There is a one-to-one correspondence between the measurement of the angular encoder and the swing boom angle with respect to the upper part.

There is a need to develop systems which determine accurately the swing boom angle of excavator without relying on integrating gyroscopes and stabilizing the gyroscope integrations by measuring gravity with an accelerometer. Further, systems are required which provide alternative approaches to track the swing boom angle and do not rely on a wire sensor.

It is therefore an object of the disclosure to provide an improved system for determining a swing boom angle of an excavator.

SUMMARY

The present disclosure relates to a system for determining a swing boom angle of an excavator (e.g. a backhoe, mini excavator, etc.), wherein the excavator comprises a vehicle frame comprising a cabin, a swing boom arranged on the vehicle frame and configured to be rotated relative to the vehicle frame about a first rotation axis and a pneumatic or hydraulic cylinder. A first end of the pneumatic or hydraulic cylinder is coupled to the vehicle frame and a second end is coupled to the swing boom, wherein the cylinder is configured to be rotated relative to the vehicle frame about a second rotation axis at the first end, wherein the cylinder is configured to rotate the swing boom (the cylinder is configured such that extension and retraction of the cylinder rotate the swing boom). The system comprises a first inertial measurement unit (IMU), configured to be mounted on the swing boom and to generate first IMU data, a second IMU configured to be mounted on the cylinder and to generate second IMU data and a processing unit. The processing unit is configured to receive the first and the second IMU data, determine a first angular velocity of the swing boom around the first rotation axis based on the first IMU data and a second angular velocity of the cylinder around the second rotation axis based on the second IMU data when the cylinder is actuated and determine the swing boom angle based on a ratio of the second angular velocity and the first angular velocity.

The disclosure provides a system to stabilize an IMU-based, in particular a gyroscope-based, measurement of the swing boom angle. The disclosed system comprises an algorithm which provides a mechanism for measuring swing boom angle any time the swing boom is moved/the swing boom angle is changed. The measurement is based on an instantaneous measurement of the angular velocity of the swing boom and the swing boom cylinder. This system can also be applied to a mini-excavator or adapted for use on articulation joints such as those on wheel loaders, motor graders, and articulated dump trucks.

In a further embodiment, the system further comprises a display unit configured to be arranged in the cabin, wherein the display unit is connected to the processing unit. The display unit is configured to provide a visualization of swing boom angle information based on the swing boom angle to the operator.

The visualization of the swing boom angle information can be realised in different ways. On the one hand, the specific value of the swing boom angle can be shown as a number on the display. On the other hand, it is also possible to display the swing boom angle by colour coding or on a colour scale. For example, a red colour can be displayed for a swing boom position left (negative angle values) of the middle position (zero degrees), which changes to a blue colour for a swing boom position right (positive angle values) of the middle position. The gradation of the individual angle values can be done by mixing different colours. Also the display via a bar, which increases in length as the value of the swing boom angle increases, is conceivable. It is also possible to display the swing boom angle via a scale on which a needle moves according to the movement of the swing boom (comparable to a compass) and thus displays the corresponding swing boom angle. Other embodiments for visualization of the swing boom angle information are also conceivable.

In a further embodiment, the first IMU comprising a first gyroscope and the second IMU comprising a second gyroscope, wherein the first gyroscope is configured to provide data about the position of the swing boom as first position data and the second gyroscope is configured to provide data about the position of the cylinder as second position data. The first and the second position data are provided by the integration of the first and the second gyroscopes. The processing unit is configured to receive the first and second position data and to determine the swing boom angle based on the first and second position data.

In a further embodiment, the processing unit is further configured to receive the first and second position data, combine the first and second position data with the first and the second IMU data (first and second angular velocity) and determine the swing boom angle based on the data combination.

In a further embodiment, the combination of the first and second position data with the first and the second IMU data is carried out by a sensor fusion algorithm.

In a further embodiment, the sensor fusion algorithm is a complementary filter and/or a Kalman filter and/or an iterative root finding scheme.

In a further embodiment, the first gyroscope is a 3-axis gyroscope.

In a further embodiment, the second gyroscope is a 3-axis gyroscope.

In a further embodiment, the system further comprises a third IMU, wherein the third IMU comprises at least one gyroscope, configured to be mounted on the vehicle frame and to generate third IMU data.

In a further embodiment, the processing unit is further configured to
  determine a third angular velocity caused by the rotation of the vehicle frame around a fourth axis of rotation based on the third IMU data,
  determine a fourth angular velocity by subtracting the third angular velocity from the first angular velocity,
  determine a fifth angular velocity by subtracting the third angular velocity from the second angular velocity,
  determine the ratio of fifth angular velocity to fourth angular velocity,
  determine the swing boom angle based on this angular velocity ratio.

The processing unit is also configured to receive the first and the third IMU data, determine the first angular velocity of the swing boom around the first rotation axis based on the first IMU data and the third angular velocity of the vehicle frame around the fourth axis of rotation based on the third IMU data and determine the swing boom angle based on a ratio of the third angular velocity and the first angular velocity.

In a further embodiment, the determination of the swing boom angle based on the angular velocity ratio is accomplished using a 1D lookup table.

In a further embodiment, the determination of the swing boom angle based on the angular velocity ratio is accomplished using a kinematic model composed of the vehicle frame, in particular of the cabin, the swing boom and the cylinder.

In a further embodiment, the first, the second and the third IMU each comprise an IMU measurement frame, the first, the second and the third IMU data each comprise a coordinate frame associated with the IMU measurement frame and the first, the second and the third IMU data are transformed into a single, common coordinate frame with one axis aligned with the first rotation axis.

In a further embodiment, the swing boom rotates relative to the vehicle frame about a third rotation axis, wherein the third rotation axis is perpendicular to the first rotation axis and wherein the processing unit is further configured to
  determine a sixth angular velocity of the swing boom around the third rotation axis based on the first IMU data,
  determine an elevation angle of the swing boom based on the first position data,
  transform the first IMU data into the single, common coordinate frame with one axis aligned with the a first rotation axis based on the sixth angular velocity and the elevation angle.

In a further embodiment, the system is configured to self-calibrate based on a self-calibration procedure including the steps:
  movement of the swing boom to a first known position,
  movement of the swing boom to a second known position,
  recording of measurements from the first and the second IMU as first and second IMU calibration data during the movement of the swing boom between the first and the second known positions,
  determination of the first angular velocity of the swing boom around the first rotation axis based on the first IMU calibration data and the second angular velocity of the cylinder around the second rotation axis based on the second IMU calibration data,
  determination of a ratio of the second angular velocity and the first angular velocity as calibration angular velocity ratio,
  generate calibration data regarding relationship between the calibration angular velocity ratio and the swing boom angle.

BRIEF DESCRIPTION OF THE DRAWINGS

Aspects are illustrated in more detail below, purely by way of example, with reference to working examples shown schematically in the drawing. Identical elements are labelled with the same reference numerals in the figures. The described embodiments are generally not shown true to scale and they are also not to be interpreted as limiting.

DETAILED DESCRIPTION

Figure 1:
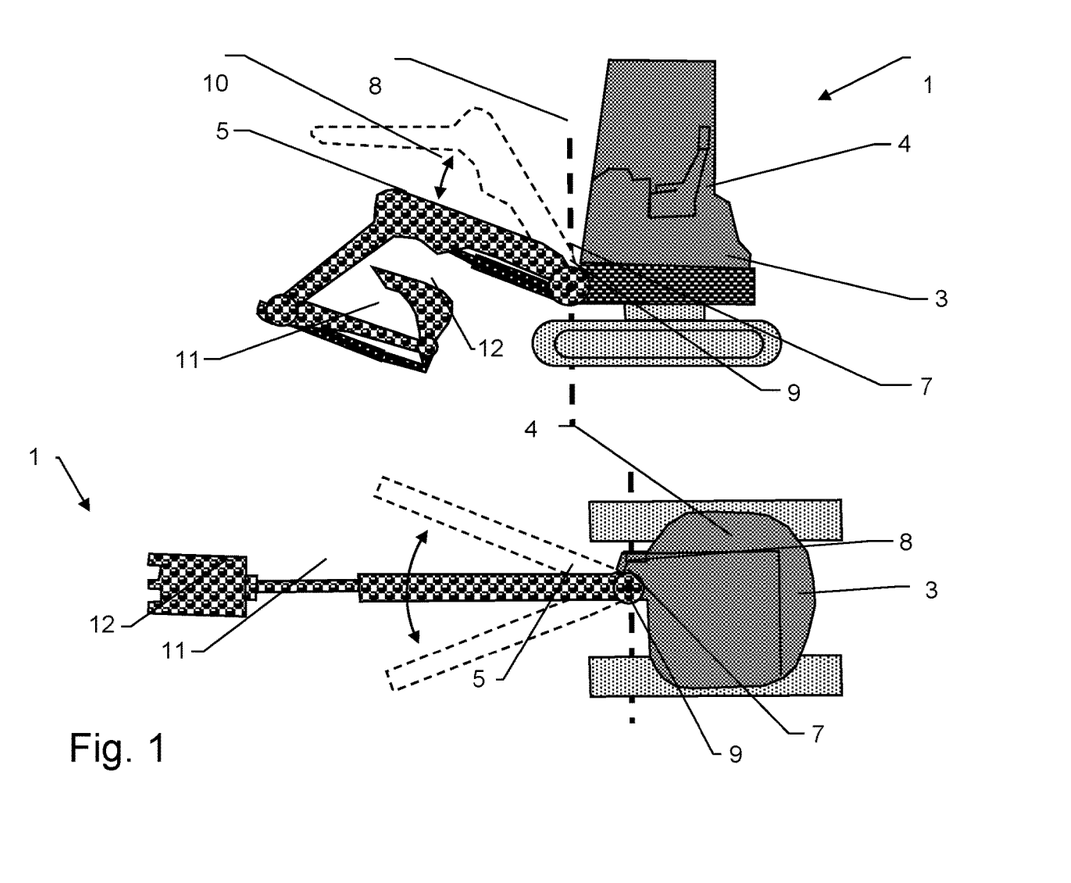
FIG. 1 shows a schematic illustration of a swing boom mini excavator in side view and from above.

FIG. 1 shows a schematic illustration of the excavator 1 in side view and from above to illustrate the individual components of the excavator 1. The excavator 1 comprises a vehicle frame 3 with a cabin 4, a swing boom 5 and a pneumatic or hydraulic cylinder 6. The swing boom 5 is arranged on the vehicle frame 3 by a swing boom joint 7 and can be rotated relative to the vehicle frame 3 about a vertical first rotation axis 8 (this degree of freedom determines the swing boom angle θSB). It is also possible to rotate the swing boom 5 about a horizontal third rotation axis 9 to raise or lower the swing boom 5 (this degree of freedom determines the so called elevation/boom angle 10). In the example shown, an arm 11 and a bucket 12 are attached to the swing boom 5 which can also be moved via horizontal rotation axis. These horizontal rotation axis are parallel to the third rotation axis 9.

Figure 2:
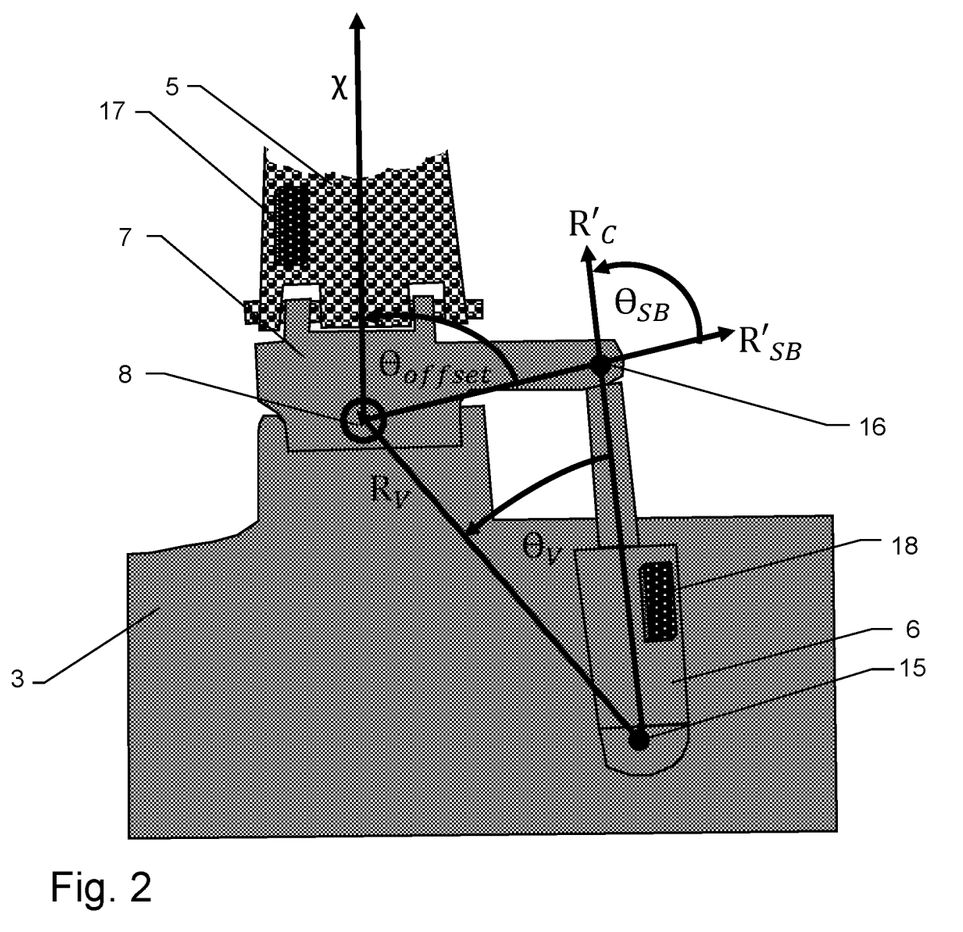
FIG. 2 shows a schematic top-down illustration of the swing boom joint with the swing boom in the middle position.

FIG. 2 shows a schematic top-down illustration of the swing boom joint 7 with the swing boom 5 in the centered/middle position. The cylinder 6 as well as the swing boom 5 are mounted on the vehicle frame 3, wherein in this example the swing boom 5 is mounted on the vehicle frame 3 through the joint 7. A first end of the cylinder 6 is coupled to the vehicle frame 3 and a second end is coupled to the swing boom 5 through the joint 7, wherein the distance between the second rotation axis 15 at the first end and the attachment position 16 of the cylinder 6 on the swing boom joint 7 is represented by the directed vector $R'_C$ (equal to the cylinder length). The distance between the second rotation axis 15 and the first rotation axis 8 is represented by the directed vector $R_V$. The distance between the first rotation axis 8 and the attachment position 16 of the cylinder 6 on the swing boom joint 7 is represented by the directed vector $R'_{SB}$. The cylinder 6 is rotated relative to the vehicle frame 3 about the second rotation axis 15 at the first end. The swing boom centerline χ is related to the swing boom angle $θ_{SB}$ though an angular offset ° offset that is dependent upon the manufactured geometry. Further, $θ_{SB}$ is the angle between $R'_C$ and $R'_{SB}$, which both are extended. $θ_V$ is the angle between $R_V$ and $R'_C$.

As the cylinder 6 is rotated relative to the vehicle frame 3 about the second rotation axis 15 the cylinder 6 extends or retracts dependent on the rotation direction. The joint 7 as well as the attached swing boom 5 are rotated, which causes the swing boom centerline χ (longitudinal axis of the swing boom 5 relative to the first rotation axis 8) to rotate relative to the vehicle frame 3 (longitudinal axis A of the vehicle frame 3 relative to the first rotation axis 8).

Figure 3:
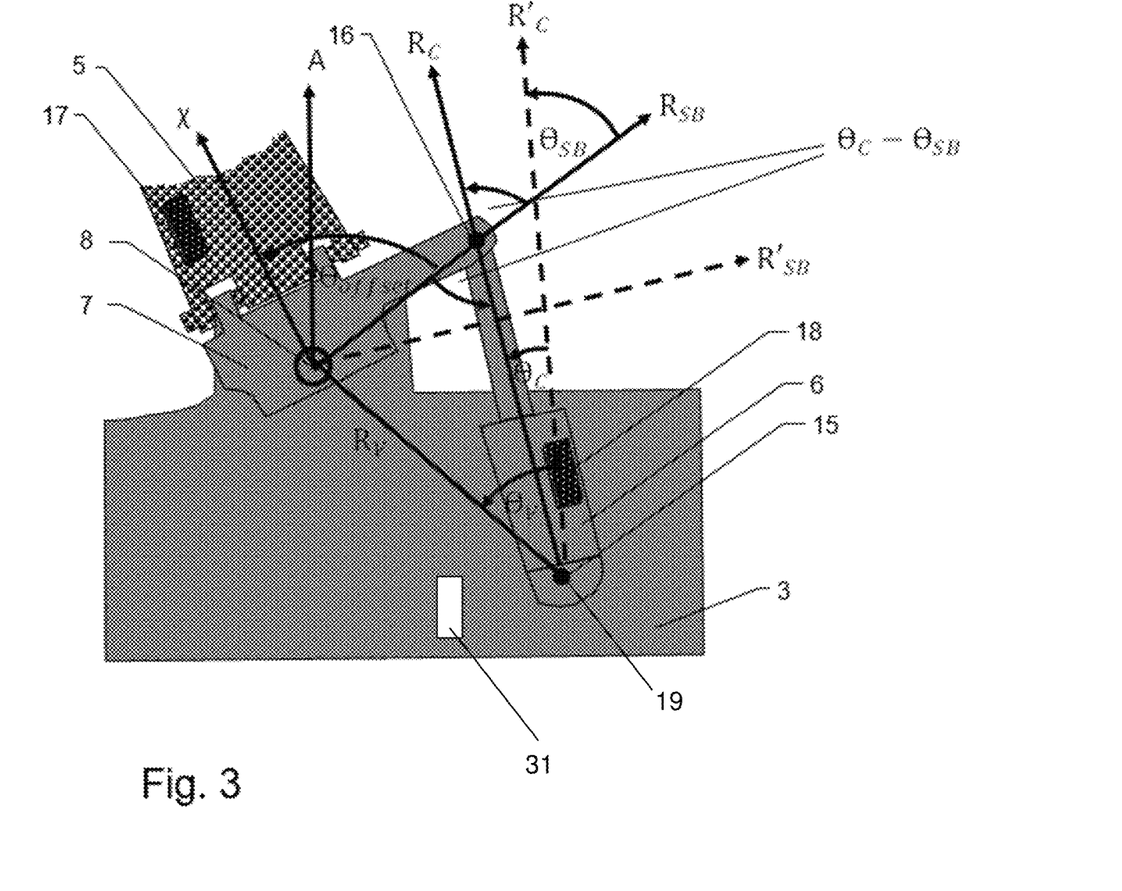
FIG. 3 shows a schematic top-down illustration of the swing boom joint with the swing boom in a moved left position.

FIG. 3 shows a schematic top-down illustration of the swing boom joint 7 with the swing boom 5 in a moved left position. Due to the counterclockwise rotation of the cylinder 6 around the second axis of rotation 15, the cylinder 6 extends. The actuated movement of the cylinder 6 presses on the joint 7, which also rotates counterclockwise around the first axis of rotation 8, causing the swing boom 5 (centerline χ) to also rotate counterclockwise and remain in a position left of the axis A. When the cylinder 6 rotates clockwise around the second axis of rotation 15, it retracts and causes the joint 7 and swing boom 5 to also move clockwise (remain in a position right of the axis A). The rotation of the cylinder 6 results in a changed direction of the distance between the second rotation axis 15 and the attachment position 16 of the cylinder 6 on the swing boom joint 7 represented by the directed vector $R_C$. The angle $θ_C$, which is formed by $R_C$ and $R'_C$, represents the angle of rotation of the cylinder 6 around the second rotation axis 15. The rotation of the joint 7 changes the position of the joint 7 relative to the vehicle frame 3, resulting in a change in the direction of $R'_{SB}$ to $R_{SB}$. This also results in a change of $θ_{SB}$, which is the angle between $R'_C$ and $R_{SB}$. The system further comprises a first inertial measurement unit (IMU) 17, configured to be mounted on the swing boom 5 and to generate first IMU data and a second IMU 18 configured to be mounted on the cylinder 6 and to generate second IMU data. A third IMU 31, wherein the third IMU 31 comprises at least one gyroscope, configured to be mounted on the vehicle frame and to generate third IMU data.

FIG. 3 also shows the mentioned vectors and angles to illustrate the mathematical determination of the swing boom angle $θ_{SB}$. For convenience the depicted angles are referenced from the horizontal (top down view), but the equations work for any referencing of the angles so long as the angles are expressed in a continuous manner over the range of the swing boom movement. Using the directed vectors to represent the lengths between two points in the structure, a vector loop equation can be written:

$R_V + R_{SB} - R_C = 0$

This is a planar equation written in the vehicle frame XY plane. Expanding the equation to include both the X and Y component equations gives:

$$R_V \begin{bmatrix} \cos θ_V \\ \sin θ_V \end{bmatrix} + R_{SB} \begin{bmatrix} \cos θ_{SB} \\ \sin θ_{SB} \end{bmatrix} - R_C \begin{bmatrix} \cos θ_C \\ \sin θ_C \end{bmatrix} = 0$$

The swing boom movement (rotation about the first rotation axis 8) has one degree of freedom. Because there is only one degree of freedom in this kinematic chain, only one of the velocities (cylinder length change velocity, cylinder angular velocity, or swing boom angular velocity) is independent. The other two velocities are a function of the independent velocity and the position of the kinematic chain within its range of motion. Therefore, if the first angular velocity ωSB and the second angular velocity $ω_C$ are both measured then sufficient information to calculate the position of the kinematic chain within its range of motion are available. Knowing the cylinder length $R_C$ enables the calculation of the swing boom angle $θ_{SB}$. And conversely, knowing the swing boom angle $θ_{SB}$ allows the calculation of the cylinder length $R_C$. These vector equations can be differentiated with respect to a change in the cylinder length $R_C$:

$$\left( R_{SB} \begin{bmatrix} -\sin θ_{SB} \\ \cos θ_{SB} \end{bmatrix} \frac{dθ_{SB}}{dR_C} - R_C \begin{bmatrix} -\sin θ_C \\ \cos θ_C \end{bmatrix} \frac{dθ_C}{dR_C} - \begin{bmatrix} \cos θ_C \\ \sin θ_C \end{bmatrix} \right) dR_C = 0$$

Now the derivative of the dependent variables, the angles, with respect to the independent variable, and the cylinder length $R_C$ can be defined:

$$\frac{dθ_{SB}}{dR_C} = θ'_{SB}, \; ω_{SB} = θ'_{SB} \dot{R}_C$$

$$\frac{dθ_C}{dR_C} = θ'_C, \; ω_C = θ'_C \dot{R}_C$$

Where the first angular velocity $ω_{SB}$ and the second angular velocity $ω_C$ is expressed with respect to the vehicle frame 3 as a function of the kinematic ratio and the cylinder speed, where positive cylinder speed is extension and negative is retraction. This results in a system of equations that can be used to calculate the motion ratios:

$$\begin{bmatrix} -R_{SB}\sin θ_{SB} & R_C \sin θ_C \\ R_{SB}\cos θ_{SB} & -R_C \cos θ_C \end{bmatrix} \begin{bmatrix} θ'_{SB} \\ θ'_C \end{bmatrix} = \begin{bmatrix} \cos θ_C \\ \sin θ_C \end{bmatrix}$$

This system of equations can be solved using several methods such as Cramer's rule, back substitution, etc. The resulting solution is:

$$\theta'_{SB} = \frac{1}{R_{SB}\sin(\theta_C - \theta_{SB})}$$

$$\theta'_C = \frac{\cos(\theta_C - \theta_{SB})}{R_C\sin(\theta_C - \theta_{SB})}$$

It is shown that the angular motion of the swing boom $\theta'_{SB}$ and the cylinder $\theta'_C$ are a function of the cylinder length $R_C$ and the angle ($\theta_C - \theta_{SB}$) between the two vectors $R_{SB}$ and $R_C$.

$$\frac{\theta'_C}{\theta'_{SB}} = \frac{R_{SB}}{R_C}\cos(\theta_C - \theta_{SB})$$

This can be extended by taking the ratio of cylinder angular velocity $\omega_C$ to swing boom angular velocity $\omega_{SB}$. Which can then be solved for the cosine of the interior angle ($\theta_C - \theta_{SB}$) of the vector loop triangle.

$$\cos(\theta_C - \theta_{SB}) = \frac{\theta'_C}{\theta'_{SB}}\frac{R_C}{R_{SB}} = \frac{\omega_C}{\omega_{SB}}\frac{R_C}{R_{SB}}$$

It can also be related the cylinder length $R_C$, the length of the base (distance between the second rotation axis 15 and the first rotation axis 8) $R_V$ and swing boom structures $R_{SB}$ (distance between the first rotation axis 8 and the attachment position 16 of the cylinder 6 on the swing boom joint 7), and the internal angle ($\theta_C - \theta_{SB}$) using the law of cosines:

$$R_C^2 + R_{SB}^2 - 2R_{SB}R_C\cos(\theta_C - \theta_{SB}) = R_V^2$$

Substituting in (the equation in [0055]) for the cosine of the internal angle ($\theta_C - \theta_{SB}$) gives:

$$R_C^2 + R_{SB}^2 - 2R_CR_{SB}\frac{\omega_C}{\omega_{SB}}\frac{R_C}{R_{SB}} = R_V^2$$

This can be solved for the cylinder length $R_C$ as a function of the angular velocity ratio $$\frac{\omega_C}{\omega_{SB}}.$$

$$R_C = \sqrt{\frac{R_V^2 - R_{SB}^2}{1 - 2\frac{\omega_C}{\omega_{SB}}}}$$

And substituting this back in to solve for the angle ($\theta_C - \theta_{SB}$) gives:

$$\theta_C - \theta_{SB} = \mathrm{acos}\left(\frac{\omega_C}{\omega_{SB}}\sqrt{\frac{R_V^2 - R_{SB}^2}{1 - 2\frac{\omega_C}{\omega_{SB}}}}\right)$$

The motion of the swing boom 5 can now be tracked using the ratio of the cylinder angular velocity $\omega_C$ to the swing boom angular velocity $\omega_{SB}$. This proceeds as follows:

1. Tracking of the rotation of the swing boom 5 about the first rotation axis 8.
2. Usage of the swing boom rotation to resolve the measured swing boom angular velocity $\omega_{SB}$ into a vertical component and a component in the horizontal plane.
3. Measurement of the angular velocity of the swing boom cylinder $\omega C$ about the second rotation axis 15 (parallel to the vehicle frame Z axis).
4. Measurement of the third angular velocity of the vehicle frame $\omega_V$ about the fourth axis of rotation 19 (parallel to the vehicle frame Z axis).
5. Calculation of the angular velocity of the swing boom $\omega_{SB}$ and swing boom cylinder $\omega_C$ relative to the angular velocity of the vehicle frame $\omega_V$ (third angular velocity caused by the rotation of the vehicle frame 3 around the fourth axis of rotation 19 based on the third IMU data).

$$\omega_{SB} = [0\ 0\ 1](R_{SB}\omega_{SB} - \omega_V)$$

$$\omega_C = [0\ 0\ 1](\omega_C - \omega_V)$$

6. Application of the derived equation to calculate the internal angle ($\theta_C - \theta_{SB}$) of the swing boom rotation.
7. Usage of any method (law of sines, law of cosines, 1-D table lookup, etc.) to relate the internal angle to the orientation of the swing boom centerline $\chi$ is with respect to the vehicle frame 3 longitudinal axis A.

Figure 4:
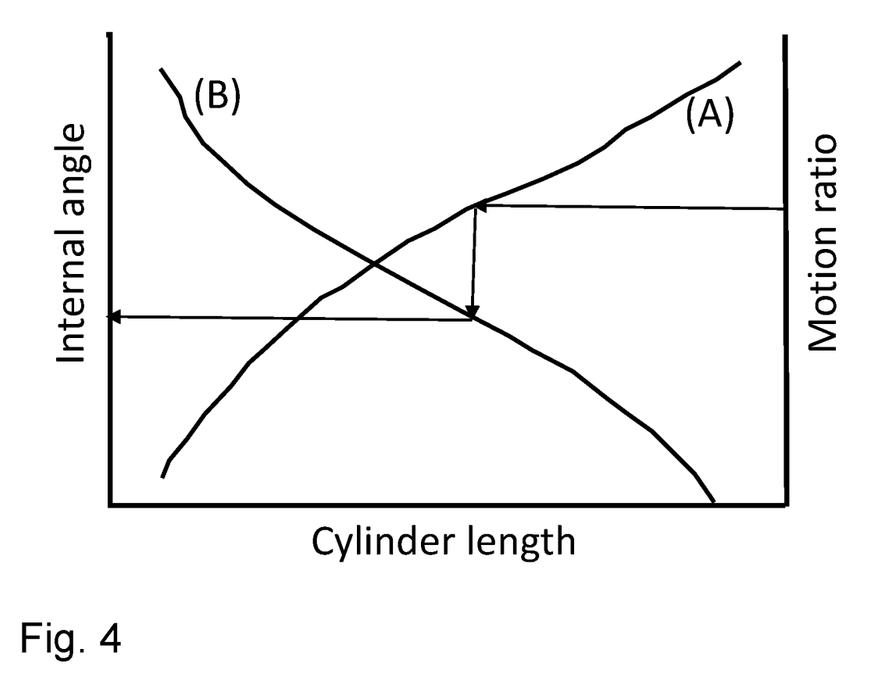
FIG. 4 shows an example plot, wherein the plot shows the kinematic relationships for the fixed geometry of the swing boom cylinder kinematic loop.

FIG. 4 shows an example plot, wherein the plot shows the kinematic relationships for the fixed geometry of the swing boom cylinder kinematic loop. The cylinder length controls the kinematic motion of the loop. Curve (A) shows the motion ratio (ratio of the second angular velocity and the first angular velocity) as a function of the cylinder length (cylinder extension level). Curve (B) shows the internal angle as a function of the cylinder length (cylinder extension level). However, since there is a single degree of freedom in this kinematic chain, knowing any one of the cylinder length, internal angle, and motion ratio is sufficient to fully define the configuration. Knowing the motion ratio enables the calculation of the cylinder length, which in turn allows for the calculation of the internal angle. Graphically this is equivalent to starting with the motion ratio and finding where the measured motion ratio intersects with the curve of motion ratio as a function of cylinder position (Curve (A)). This corresponds to a horizontal line on the plot. The next step is to determine where this cylinder length intersects with the curve of the internal angle as a function of cylinder position (Curve (B)). This corresponds to a vertical line on the plot. The resulting internal angle corresponds to the measured motion ratio. This is determined using another horizontal line on the plot.

Although a graphical method has been discussed, this is equivalent to having a 1-D lookup table or analytical equation that converts motion ratio into cylinder length, and a 1-D lookup table or analytical equation that converts cylinder length into internal angle. If the cylinder length is only used as an intermediate value and not for any other purpose, then a single 1-D lookup table or analytical equation can be used to directly convert a measured motion ratio into the corresponding internal angle.

The base vector $R_V$ is [750 300] mm in vehicle XY coordinates. The swing boom vector $R_{SB}$ is [100-300] mm in swing boom coordinates. The cylinder length $R_C$ ranges from 687 mm to 990 mm and the swing boom angle $\theta_{SB}$ varies from −30 degrees to +30 degrees. Both the internal angle ($\theta_C - \theta_{SB}$) and the motion ratio have a one-to-one correspondence with the cylinder length $R_C$.

The angle estimate provided by this method can be combined with an estimate determined by gyroscope integration in a sensor fusion algorithm. Any suitable algorithm can be used such as a complementary filter, a Kalman filter, an iterative root finding scheme, etc.

To limit the impact of mounting misalignment in the second (swing boom cylinder 6) gyroscope 20, a 3-axis gyroscope can be used. The swing boom 5 can then be actuated several times and a calibration rotation can be calculated that aligns the measured second angular velocity $\omega_C$ with the Z axis of the measurement frame.

Rather than transform the 3-axis gyroscope measurement from the first IMU 17 into the horizontal plane, a single axis gyroscope can be mounted on the swing boom 5 to directly measure rotational speed about the first rotation axis 8. Just as in the case of the cylinder gyro 20, a 3-axis gyroscope can be used and a calibration rotation can be calculated to ensure the measurement frame is aligned with the vehicle frame Z-axis.

If the cylinder 6 is outfitted with a sensor for speed measurement, then the described method can be applied using the ratio of swing boom angular speed to cylinder speed and the law of sines to relate the internal angle ($\theta_C - \theta_{SB}$) between $R_{SB}$ and $R_C$ to the angle between A and $\chi$.

$$\theta'_{SB} = \frac{\omega_{SB}}{\dot{R}_C} = \frac{1}{R_{SB}\sin(\theta_C - \theta_{SB})}$$

$$\theta_C - \theta_{SB} = \arcsin\left(\frac{\dot{R}_C}{\omega_{SB} R_{SB}}\right)$$

Note that care must be taken with this approach as the arcsine has a range of −90 to 90 degrees and cannot distinguish between an internal angle of 80 degrees and an internal angle of 100 degrees. Logic should be included to ensure that the correct angle is used in the vicinity of a 90 degree angle and that the gyro measurements are used to correctly manage the solution as it passes through 90 degrees.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A system for determining a swing boom angle of an excavator, wherein the excavator comprises:
a vehicle frame comprising a cabin,
a swing boom arranged on the vehicle frame and configured to be rotated relative to the vehicle frame about a first rotation axis,
a pneumatic or hydraulic cylinder, a first end of which is coupled to the vehicle frame and a second end of which is coupled to the swing boom, the cylinder being configured to be rotated relative to the vehicle frame about a second rotation axis at the first end, wherein the cylinder is configured to rotate the swing boom,
the system comprising:
a first inertial measurement unit (IMU), configured to be mounted on the swing boom and to generate first IMU data,
a second IMU configured to be mounted on the cylinder and to generate second IMU data,
a processing unit configured to:
receive the first and the second IMU data
determine a first angular velocity of the swing boom around the first rotation axis based on the first IMU data and a second angular velocity of the cylinder around the second rotation axis based on the second IMU data when the cylinder is actuated, and
determine the swing boom angle based on a ratio of the second angular velocity and the first angular velocity.

2. The system according to claim 1, wherein the system further comprises a display unit configured to be arranged in the cabin, wherein the display unit is connected to the processing unit, the display unit being configured to provide a visualization of swing boom angle information based on the swing boom angle to the operator.

3. The system according to claim 1, with the first IMU comprising a first gyroscope and the second IMU comprising a second gyroscope, wherein the first gyroscope is configured to provide data about the position of the swing boom as first position data and the second gyroscope is configured to provide data about the position of the cylinder as second position data.

4. The system according to claim 3, wherein the processing unit is further configured to:
receive the first and second position data;
combine the first and second position data with the first and the second IMU data, and
determine the swing boom angle based on the data combination.

5. The system according to claim 4, wherein the combination of the first and second position data with the first and the second IMU data is carried out by a sensor fusion algorithm.

6. The system according to claim 5, wherein the sensor fusion algorithm is:
a complementary filter, and/or
a Kalman filter, and/or
an iterative root finding scheme.

7. The system according to claim 3, wherein the first gyroscope is a 3-axis gyroscope.

8. The system according to claim 3, wherein the second gyroscope is a 3-axis gyroscope.

9. The system according to claim 1, the system further comprising a third IMU, wherein the third IMU comprises at least one gyroscope, configured to be mounted on the vehicle frame and to generate third IMU data.

10. The system according to claim 9, wherein the processing unit is further configured to
determine a third angular velocity caused by the rotation of the vehicle frame around a fourth axis of rotation based on the third IMU data,
determine a fourth angular velocity by subtracting the third angular velocity from the first angular velocity,
determine a fifth angular velocity by subtracting the third angular velocity from the second angular velocity,
determine an angular velocity ratio of fifth angular velocity to fourth angular velocity, and
determine the swing boom angle based on the angular velocity ratio.

11. The system according to claim 10, wherein the determination of the swing boom angle based on the angular velocity ratio is accomplished using a 1D lookup table.

12. The system according to claim 10, wherein the determination of the swing boom angle based on the angular velocity ratio is accomplished using a kinematic model composed of the vehicle frame, the swing boom and the cylinder.

13. The system according to claim 9, wherein:

the first, the second and the third IMU each comprise an IMU measurement frame, the first, the second and the third IMU data each comprise a coordinate frame associated with the IMU measurement frame, the first, the second and the third IMU data are transformed into a single, common coordinate frame with one axis aligned with the first rotation axis.

14. The system according to claim 13, wherein the swing boom rotates relative to the vehicle frame about a third rotation axis, wherein the third rotation axis is perpendicular to the first rotation axis and wherein the processing unit is further configured to:

determine a sixth angular velocity of the swing boom around the third rotation axis based on the first IMU data, determine an elevation angle of the swing boom based on the first position data, transform the first IMU data into the single, common coordinate frame with one axis aligned with the a first rotation axis based on the sixth angular velocity and the elevation angle.

15. The system according to claim 1, wherein the system is configured to self-calibrate based on a self-calibration procedure including the steps:

movement of the swing boom to a first known position, movement of the swing boom to a second known position, recording of measurements from the first and the second IMU as first and second IMU calibration data during the movement of the swing boom between the first and the second known positions, determination of the first angular velocity of the swing boom around the first rotation axis based on the first IMU calibration data and the second angular velocity of the cylinder around the second rotation axis based on the second IMU calibration data, determination of a ratio of the second angular velocity and the first angular velocity as calibration angular velocity ratio, generate calibration data regarding relationship between the calibration angular velocity ratio and the swing boom angle.

* * * * *